US012226026B2

(12) United States Patent
Dimovski et al.

(10) Patent No.: US 12,226,026 B2
(45) Date of Patent: Feb. 18, 2025

(54) HEADREST FOR A SEAT AND SEAT

(71) Applicant: ADIENT ENGINEERING AND IP GMBH, Burscheid (DE)

(72) Inventors: Dalibor Dimovski, Macomb, MI (US); James D. Biebel, Milford, MI (US); John J. Gomez, Howell, MI (US)

(73) Assignee: Adient US LLC, Plymouth, MI (US)

( * ) Notice: Subject to any disclaimer, the term of this patent is extended or adjusted under 35 U.S.C. 154(b) by 28 days.

(21) Appl. No.: 17/420,222

(22) PCT Filed: Jan. 7, 2020

(86) PCT No.: PCT/EP2020/050228
§ 371 (c)(1),
(2) Date: Jul. 1, 2021

(87) PCT Pub. No.: WO2020/144190
PCT Pub. Date: Jul. 16, 2020

(65) Prior Publication Data
US 2022/0087430 A1 Mar. 24, 2022

Related U.S. Application Data

(60) Provisional application No. 62/788,972, filed on Jan. 7, 2019.

(51) Int. Cl.
*A47C 7/38* (2006.01)
*A47C 31/12* (2006.01)
*B60N 2/02* (2006.01)
*B60N 2/868* (2018.01)

(52) U.S. Cl.
CPC .............. *A47C 7/38* (2013.01); *A47C 31/126* (2013.01); *B60N 2/0244* (2013.01); *B60N 2/868* (2018.02); *B60N 2/0268* (2023.08)

(58) Field of Classification Search
CPC .. A47C 7/38; A47C 7/36; A47C 1/036; B60N 2/865; B60N 2/868
See application file for complete search history.

(56) References Cited

U.S. PATENT DOCUMENTS

| 8,201,883 | B2 * | 6/2012 | Wuerstlein | ............. | B60N 2/002 |
| | | | | | 297/216.12 |
| 9,340,131 | B1 * | 5/2016 | Kolich | .................... | B60N 2/865 |
| 11,375,824 | B2 * | 7/2022 | Bussert | .................. | B60N 2/976 |

(Continued)

FOREIGN PATENT DOCUMENTS

| DE | 196 02 909 A1 | 7/1997 |
| DE | 101 39 412 A1 | 3/2003 |

(Continued)

OTHER PUBLICATIONS

PCT International Search Report and Written Opinion (PCT/EP2020/050228).

*Primary Examiner* — Syed A Islam
(74) *Attorney, Agent, or Firm* — Marshall & Melhorn, LLC

(57) ABSTRACT

The disclosure refers to a headrest for a seat. The headrest has at least a headrest cushion which is mountable to the seat. The headrest cushion may have an adjustment device configured to at least partially deform a front surface of the headrest cushion along at least one extending direction of the headrest cushion. Further, the disclosure relates to a seat with such a headrest.

13 Claims, 8 Drawing Sheets

(56) References Cited

U.S. PATENT DOCUMENTS

| | | |
|---|---|---|
| 2016/0059750 A1 | 3/2016 | Lem et al. |
| 2018/0118054 A1 | 5/2018 | Devilbiss et al. |
| 2018/0134189 A1* | 5/2018 | Iwasaki .................. B60N 2/885 |
| 2018/0297488 A1* | 10/2018 | Lem ....................... B60N 2/002 |
| 2018/0339624 A1 | 11/2018 | Leck |

FOREIGN PATENT DOCUMENTS

| | | |
|---|---|---|
| DE | 10 2015 117 982 A1 | 5/2016 |
| WO | 2001040012 A2 | 6/2001 |

* cited by examiner

HEADREST FOR A SEAT AND SEAT

BACKGROUND OF THE DISCLOSURE

The present disclosure relates generally to a headrest for a seat, in particular a vehicle seat. Further, the present disclosure relates generally to a seat, in particular vehicle seat, with such a headrest.

Adjustable headrests are known from the prior art. Mostly, headrests for vehicle seats are adjustable in height or inclination. For example, such a headrest usually comprises a padded support and an adjustment device. Further, the headrest comprises two headrest rods or a support bracket which are or is, for instance, height adjustable mounted to a backrest of the seat.

SUMMARY OF THE DISCLOSURE

It is an object of the present disclosure to provide a headrest for a seat, in particular vehicle seat, which is comfortably adjustable to fit to any position of an occupant. Further, an object of the present disclosure is to improve a self-acting adjustment of the headrest depending on an occupant's position for supporting an occupant's comfort.

According to the disclosure, the object of the headrest is solved by the features claimed and the object of the seat is solved by the features of the claims.

According to the disclosure, a headrest for a seat comprises at least a headrest cushion which is mountable to the seat, wherein the headrest cushion comprises an adjustment device which is configured to at least partially deform a front surface of the headrest cushion along at least one extending direction of the headrest cushion.

The present invention relates to an improved headrest cushion to properly support an occupant's head in various positions of the occupant. It is understood that a position of the head means a location of the head and neck of an occupant. In particular, by usage of an adjustable front surface a compact design of the headrest can be achieved. Moreover, a deformation of the front surface along the extending direction of the headrest cushion increases comfort feeling for the occupant. It is to be understood that deformation of the front surface relates to a movement of the front surface, in particular of front surface areas or portions, in a direction towards the occupant and in the at least one extending direction of the headrest cushion. For instance, one extending direction relates to a transverse extending direction of the headrest cushion and another extending direction relates to a vertical extending direction of the headrest cushion.

In particular, the deformation of the front surface results in a raised front surface area or portion towards the occupant. The raised front surface area or portion can be used as a support for the occupant to lean against. In particular, the front surface is adjusted to bias against the occupant's head, for instance for comfort increase, reinforcement and safety. Furthermore, the adjustment device is configured to deform the front surface following an occupant's position, in particular a head position. For instance, the deformation of the front surface follows an occupant's head movement and/or position. Particularly, a continuous deformation of each front surface area or portion across an extending direction of the headrest cushion equals a wave-like movement. The headrest is a system that creates deformation in a head restraint surface to properly support the head in various positions of the occupant. The deformation fits within the shape criteria of federal safety regulations.

In a further embodiment, the headrest cushion comprises a lower area for an occupant's neck. A front surface of the lower area is configured to be deformed by the adjusting device. Thereby, a neck support surface is created for the occupant.

According to a further embodiment, the adjustment device is configured to at least partially deform the front surface depending on a position of an occupant's head.

According to another embodiment, the adjustment device is configured to at least partially deform the front surface depending on a movement of the occupant's head along the extending direction of the headrest cushion. In particular, a comparatively more comfortable and safer headrest positioning throughout position changes of the occupant can be achieved.

In another embodiment, the adjustment device is configured to deform the front surface of the headrest cushion in real-time with regard to a position and/or a movement of an occupant's head. In particular, the deformation fits within the shape criteria of federal safety regulations.

In an embodiment, the front surface is divided into front surface areas, wherein the adjustment device is configured to operate deformation of one or more front surface areas at the same time or in sequence. Particularly, a smooth and wave-like motion may be carried out by the adjustment device when following an occupant's head.

In a further embodiment, the adjustment device is configured to automatically operate deformation of the front surface or front surface areas upon determination of a change of an occupant's position.

According to a further embodiment, the adjustment device comprises a plurality of deforming elements which are configured to push against a back of the front surface of the headrest cushion. For example, the deforming elements are static in a normal, non-actuated state. When the adjustment device is actuated, e.g. by actuators, the deforming elements may be supplied with an electric current. The deforming elements translate forward, i.e. against the back of the front surface to push the front surface in a direction towards the occupant. For instance, depending on a current strength supplied to each of the deforming elements, an adjustment velocity of each deforming element and/or a projecting range towards the occupant is settable. For example, a control unit sets the current strength of each deforming element. The deforming elements may be spring-loaded comprising spring elements. The deforming elements are coupled to actuators. For example, the deforming elements are pins or bolts which are configured to bias against the front surface or front surface areas. The deforming elements may be movable elements such as plates, discs, cam elements. In a further embodiment, the deforming elements are deformable elements such as fluid inflatable elements. For example, deformable elements are air inflatable pads or pouches. In a normal, non-actuated state of the adjustment device its fluid inflatable elements are substantially empty and not filled with a fluid, such as air. In an actuated state of the adjustment device its fluid inflatable elements are filled with a fluid. Therefore, the adjustment device is coupled to one or more fluid devices, such as fluid suppliers and ventilation devices.

According to an embodiment, the adjustment device comprises at least one array of deforming elements arranged on a back of the front surface of the headrest cushion.

According to another embodiment, the adjustment device comprises a plurality of fluid inflatable elements which are configured to push against a back of the front surface or front surface areas of the headrest cushion.

In a further embodiment, the adjustment device comprises a plurality of movable elements which are arranged adjacent to each other along an extending direction of the headrest cushion and which are configured to push against a back of the front surface or front surface areas of the headrest cushion. The movable elements are connected in-line to each other. The movable elements are configured to move individually or dependent from each other. For example, the movable elements are cam elements which are connected to each other via a rod.

It is understood that a combination of different deformers, such as movable, substantially rigid deforming elements and size-changing deformable elements, can be provided and arranged on the back, i.e. rear side of the front surface of the headrest.

In another further embodiment, the headrest cushion comprises a number of pressure-sensitivity sensors for determining a position and/or a movement of an occupant's head. For example, a number of pressure-sensitivity sensors are configured as a pressure-sensitivity pad, wherein the headrest cushion comprises a number of such pressure-sensitivity pads arranged adjacent to each other, in particular along at least one extending direction of the headrest cushion. In an exemplary embodiment, the pressure-sensitivity sensors and/or pads are arranged on a back surface and/or the front surface and/or in an intermediate mounting space between the back and the front surfaces of the headrest cushion. The pressure-sensitivity sensors and/or pads are configured to determine a current position or rather location of the occupant's head resting on the front surface of the headrest cushion and optionally a further movement direction of the occupant's head. The front surface is adjusted, in particular deformed, to match the position, i.e. location of the occupant's head. Therefore, the adjustment or rather the deformation of the front surface happens in real-time as the occupant's head moves along the front surface of the headrest cushion. In particular, as the occupant shifts weight or rather pressure on the front surface of the headrest cushion, the pressure-sensitivity sensors and/or pads determine the position and movement of the occupant's head, whereas the front surface maintains an alignment location to the occupant's head.

According to another possible embodiment, the adjustment device and the pressure-sensitivity sensors of the headrest cushion are coupled to each other in a signaling manner. For instance, the adjustment device and the pressure-sensitivity sensors are coupled to each other via a control unit. In particular, the adjustment device and the pressure-sensitivity sensors are coupled to each other via a communication link, wherein the adjustment device is configured to be actuated depending on determined signals of the pressure-sensitivity sensors. The communication link, such as a wire or cable, is coupled to a control unit. The control unit receives signals detected by the pressure-sensitivity sensors, whereas the control unit is configured to evaluate the signals and to actuate the adjustment device, in particular its deforming elements. Therefore, the control unit comprises a software which evaluate received input signals and transmits output signals as a result of the received input signals.

Another embodiment refers to a headrest cushion, wherein at least the front surface is made of soft and flexible material.

Further, the present invention refers to a seat, in particular a vehicle seat, comprising at least a backrest and a headrest, wherein the headrest comprises at least a headrest cushion. The headrest cushion comprises an adjustment device which is configured to at least partially deform a front surface of the headrest cushion along at least one extending direction of the headrest cushion. In particular, the headrest cushion fully extends over a width of the backrest. Further, the headrest cushion may be shaped in curved or arced manner. Further, the headrest comprises a mounting bracket, such as mounting rods or a u-shaped bracket, which is partially embedded within the headrest cushion and mounted to the backrest to hold the headrest cushion on the backrest. Moreover, the seat comprises a seat pan to which the backrest is coupled, for instance, adjustable or rather inclinable. In another embodiment, the mounting bracket, particularly the rods or the u-shaped bracket is height adjustable mounted to the backrest in common manner.

According to an embodiment, the backrest and additionally optionally the seat pan comprises each a number of pressure-sensitivity sensors for determining a position and/or a movement of an occupant's body. For example, a number of pressure-sensitivity sensors are configured as a pressure-sensitivity pad, wherein the backrest comprises a number of such pressure-sensitivity pads arranged adjacent to each other in a transverse and vertical direction of the backrest and optionally, the seat pan comprises a number of such pressure-sensitivity pads arranged adjacent to each other in a transverse and longitudinal direction of the seat pan. The front surface of the headrest cushion is adjusted, in particular deformed, to match the position of the occupant's head which can be dependent evaluated by the occupant's body position and/or movement. Therefore, the adjustment or rather the deformation of the front surface happens in real-time as the occupant's body moves along the backrest and/or the seat pan, in particular in a transverse direction. In particular, as the occupant shifts weight or rather pressure on the backrest and the seat pan, the pressure-sensitivity sensors and/or pads track the position and/or movement of the occupant. For example, a control unit is coupled to the pressure-sensitivity sensors and/or pads such that the control unit evaluates and determines the position and/or movement of the occupant's head and neck as a result of the movement and/or position of the occupant's body.

In another embodiment of the seat, the pressure-sensitivity sensors of the backrest and optionally the pressure-sensitivity sensors of the seat pan as well as the adjustment device of the headrest cushion are coupled to each other in a signaling manner, in particular via a communication link, e.g. a cable or wire arrangement. The adjustment device is configured to be actuated depending on determined signals by the pressure-sensitivity sensors. For instance, the adjustment device and the pressure-sensitivity sensors are coupled to each other via a control unit. The control unit receives the determined signals of the pressure-sensitivity sensors and evaluates them to actuate the adjustment device according to evaluated signals.

By use of pressure-sensitivity sensors and/or pads on the seat, the location of the body and head is determined by a software, and the location of the deformation on a head restraint is adjusted to match the location. This happens in real-time as the occupant moves position in the seat.

BRIEF DESCRIPTION OF THE DRAWINGS

The present disclosure will become more fully understood from the detailed description given herein below and the accompanying drawings which are given by way of illustration only, and thus, are not limitative of the present disclosure, wherein.

Corresponding parts are marked with the same reference symbols in all figures.

DETAILED DESCRIPTION OF PREFERRED EMBODIMENTS

Figure 1:
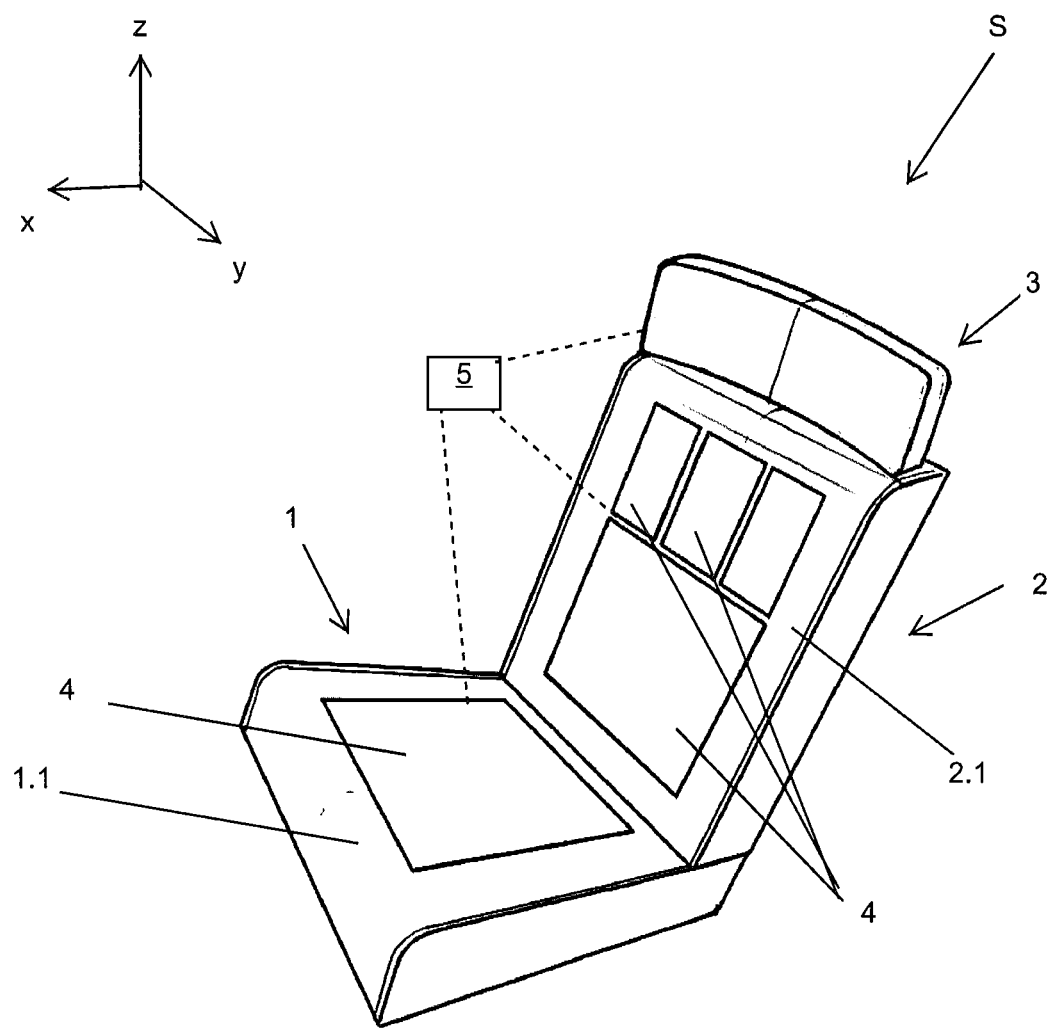
FIG. 1 shows schematically a perspective view of an embodiment of a seat, in particular a vehicle seat.

FIG. 1 shows a perspective view of a seat S, in particular a vehicle seat. The seat S comprises a seat pan 1 and a backrest 2. The backrest 2 is mounted to the seat pan 1. The backrest 2 may be adjustable, in particular inclinable, mounted to the seat pan 1.

For a better understanding of subsequent descriptions of the seat S a coordinate system is shown in further figures. The coordinate system comprises a longitudinal axis x, a transverse axis y and a vertical axis z in relation to the seat S as shown.

The seat S comprises a headrest 3 which is adjustable to support an occupant's head so as to improve occupant's comfort.

The backrest 2 and optionally additionally the seat pan 1 comprises each a number of pressure-sensitivity pads 4 for determining a position and/or a movement of an occupant's body sitting on the seat S. For example, each pressure-sensitivity pad 4 comprises a number of pressure-sensitivity sensors 4.1 to 4.n. For example, a plurality of pressure-sensitivity sensors 4.1 to 4.n is arranged in arrays to form one or more pressure-sensitivity pads 4. Each pressure-sensitivity pad 4 at least partially covers a seating zone SZ1, SZ2 of the seat S. The seat pan 1 comprises one seating zone SZ1 and the backrest 2 comprises another seating zone SZ2. For example, the backrest 2 comprises a number of such pressure-sensitivity pads 4 arranged adjacent to each other in a transverse and vertical direction of the backrest 2. For instance, four pressure-sensitivity pads 4 are arranged in the seating zone SZ2. Optionally additionally, the seat pan 1 comprises a number of such pressure-sensitivity pads 4 arranged adjacent to each other in a transverse and longitudinal direction of the seat pan 1. In the shown embodiment, the seat pan 1 comprises one large pressure-sensitivity pad 4 covering the seating zone SZ1 of the seat S. The backrest 2 can also comprise one large pressure-sensitivity pad 4 covering the seating zone SZ2 of the seat S. For instance, the pressure-sensitivity pads 4 are embedded within a backrest cushion 2.1 and a seat pan cushion 1.1. The pressure-sensitivity pads 4 may be embedded within a backrest cover and a seat pan cover, a trim panel or the like.

Further, the pressure-sensitivity pads 4 are each coupled to a control unit 5 in a signaling manner, in particular via communication links L. The control unit 5 is coupled to the headrest 3 to actuate an adjustment of the headrest 3 depending on input signals received and transmitted from the pressure-sensitivity pads 4.

Figure 2:
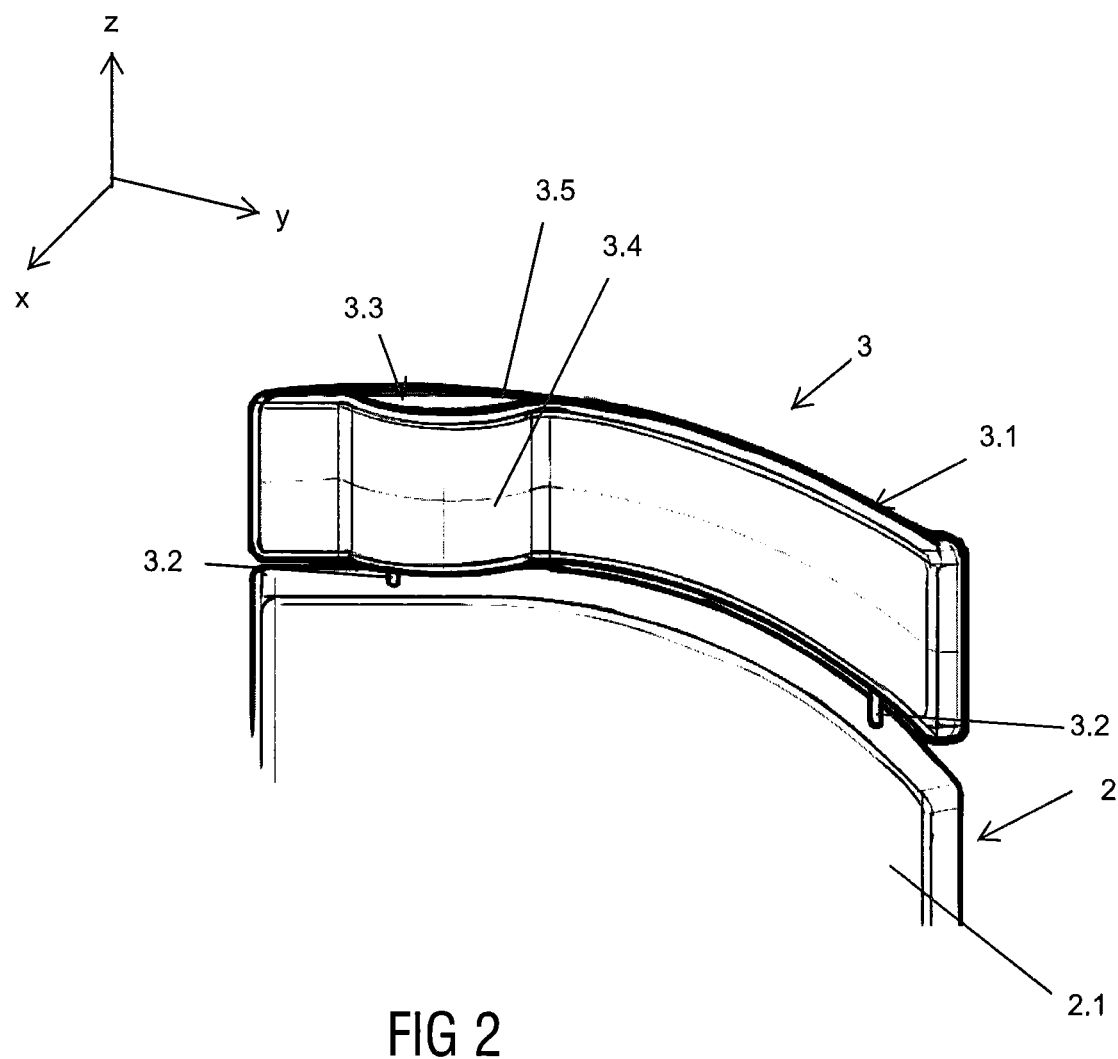
FIGS. 2 and 3 show schematically each a perspective view of an embodiment of an adjustable headrest for the seat.
Figure 3:
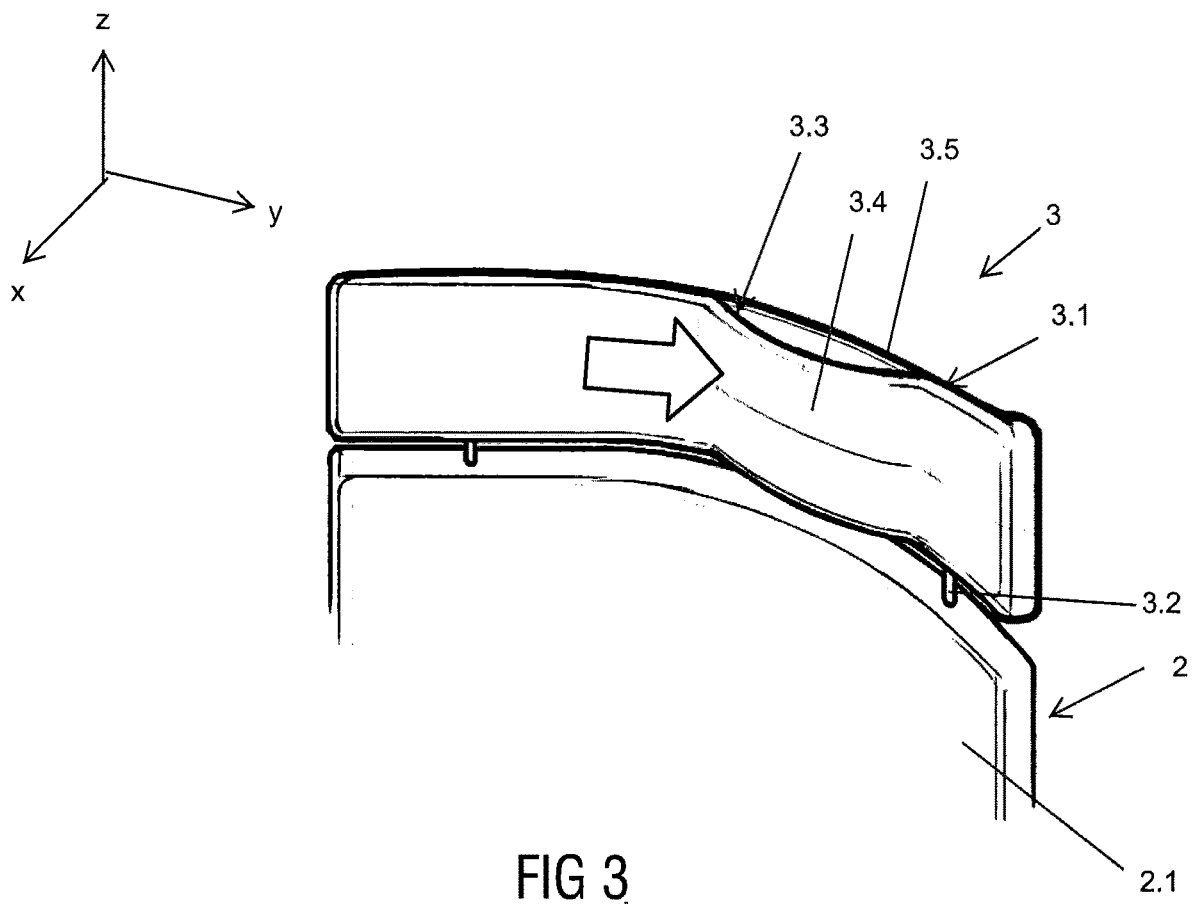

FIGS. 2 and 3 each shows a perspective view of an embodiment of an adjustable headrest 3 for the seat S. The headrest 3 comprises a headrest cushion 3.1 which is mounted to the backrest 2. For example, the headrest 3 comprises commonly known mounting rods 3.2 or a u-shaped mounting bracket which is partially embedded within the headrest cushion 3.1 at one end and which is inserted in the backrest 3 at the other end.

The headrest cushion 3.1 comprises an adjustment device 3.3 which is configured to deform a front surface 3.4 of the headrest cushion 3.1 along at least one extending direction of the headrest cushion 3.1. In particular, the front surface 3.4 is deformable across a vertical and transverse length of the headrest cushion 3.1. Additionally, the front surface 3.4 is deformable in a longitudinal direction of the seat S, particularly in a direction towards the occupant. The headrest cushion 3.1 comprises a fixed, in particular immovable back surface 3.5. Thereby, the front surface 3.4 is deformable in a direction away from the back surface 3.5 of the headrest cushion 3.1. For example, deformation of the front surface 3.4 refers to a movement or extension of the front surface 3.4 in a direction towards the occupant. The headrest 3 comprises a substantially curved or arc-shape. To ensure that the head of the occupant can always be supported along the transverse extension direction of the headrest 3 in each position the occupant may take, the front surface 3.4 is configured adaptable and so as deformable.

For instance, the front surface 3.4 is divided into a number of partial front surface areas 3.4.1 to 3.4.n, wherein each front surface area 3.4.1 to 3.4.n is evenly and smoothly deformable. The front surface 3.4 may be divided into vertical extending front surface areas 3.4.1 to 3.4.3 or transverse extending front surface areas 3.4.4 to 3.4.n. Each front surface area 3.4.1 to 3.4.n is deformable independent from each other. For example, a deformation range of each front surface area 3.4.1 to 3.4.n is variable independent from each other. A change of a deformation direction is carried out in a wave-like manner. The adjustment device 3.3 is configured to operate deformation of one or more front surface areas 3.4.1 to 3.4.n at the same time or in sequence. In particular, a deformation of the front surface 3.4 is provided by one or more raised front surface areas 3.4.1 to 3.4.n towards the occupant. The raised front surface area 3.4.1 or the raised front surface areas 3.4.1 to 3.4.n can be used as a support for the occupant to lean against. Furthermore, the adjustment device 3.3 is configured to deform the front surface 3.4 following an occupant's position, in particular head and/or body position. For instance, the deformation of the front surface 3.4 follows an occupant's movement which refers to a change of a current position of the head and body. In particular, the head position is evaluated by the control unit 5 depending on received input body position signals by the pressure-sensitivity pads 4 whereas the head position is determined as result of the body position.

In particular, the adjustment device 3.3 is configured to deform the front surface 3.4 depending on a determined position of an occupant's head and/or depending on a movement of the occupant's body on the seat S. Particularly, the adjustment device 3.3 is configured to deform the front surface 3.4 in a self-actuating manner. The adjustment device 3.3 is configured to automatically adjust the front surface 3.4 when receiving a control signal from the control unit 5. The front surface 3.4 of the headrest cushion 3.1 is adjusted, in particular deformed, to match the position of the occupant's head which is dependent evaluated by the occupant's body position and/or movement. Therefore, the adjustment or rather the deformation of the front surface 3.4 happens in real-time as the occupant's body moves along the backrest 2 and/or the seat pan 1, in particular in a transverse direction. In particular, as the occupant shifts weight or rather pressure on the backrest 2 and/or the seat pan 1, the pressure-sensitivity pads 4 determine the position of the occupant's head as a result of the movement and/or position of the occupant's body.

Figure 4:
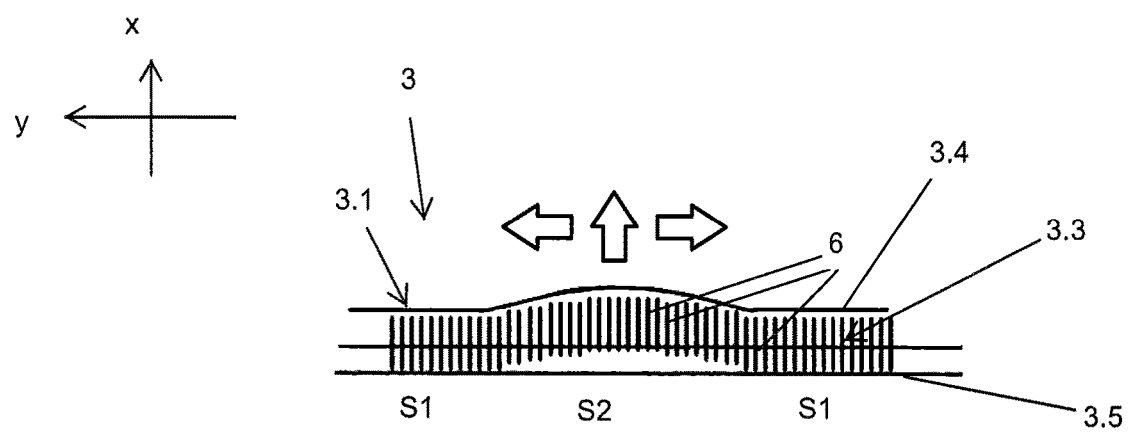
FIG. 4 shows schematically a top view of the headrest according to FIGS. 2A and 2B.

As seen in FIG. 4, the adjustment device 3.3 comprises a plurality of deforming elements 6. The deforming elements 6 are configured to push against a rear of the front surface 3.4 of the headrest cushion 3.1. For example, the deforming elements 6 are static in a normal, non-actuated state S1. When the adjustment device 3.3 starts activating the deforming elements 6, the deforming elements 6 are supplied with an electric current, whereas the deforming elements 6 are set to a use, actuated state S2. The deforming elements 6 translate forward, i.e. against the rear of the front surface 3.4 to push the front surface 3.4 in a direction towards the occupant. For instance, depending on a current strength supplied to each of the deforming elements 6, an adjustment velocity of each deforming element 6 and/or a projecting range towards the occupant is settable. The deforming elements 6 are, for example, configured as extendable and retractable pins. For example, front surface areas 3.4.4 and 3.4.6 are less projecting as far towards an occupant as the front surface area 3.4.5. The deforming elements 6 of the front surface areas 3.4.4 and 3.4.6 are actuated but provide a different projecting range than the projecting range of the deforming elements 6 of the front surface area 3.4.5. The front surface areas 3.4.7 to 3.4.n comprise non-actuated deforming elements 6 which rest in their initial retracted position. Optionally, the deforming elements 6 are configured as bladders which are inflatable with a medium, such as a gas or fluid, to change in size. The front surface 3.4 is made of a flexible and elastic material, e.g. synthetic, textile material. The adjustment device 3.3 is embedded within the headrest cushion 3.1. In particular, the deforming elements 6 are arranged within the headrest cushion 3.1. The deforming elements 6 are arranged between the front surface 3.4 and the back surface 3.5. The headrest cushion 3.1 is, e.g. made of foam material.

The adjustment device 3.3 is configured to be actuated depending on signals detected by the pressure-sensitivity pads 4. For instance, the adjustment device 3.3 and the pressure-sensitivity pads 4 are coupled to each other via the control unit 5. The control unit 5 receives signals detected by the pressure-sensitivity pads 4, whereas the control unit 5 is configured evaluating the signals and to actuate the adjustment device 3.3, in particular its deforming elements 6, depending on the signals detected by the pressure-sensitivity pads 4. Therefore, the control unit 5 comprises a software which transmits output, control signals as a result of the detected input signals.

Figure 5:
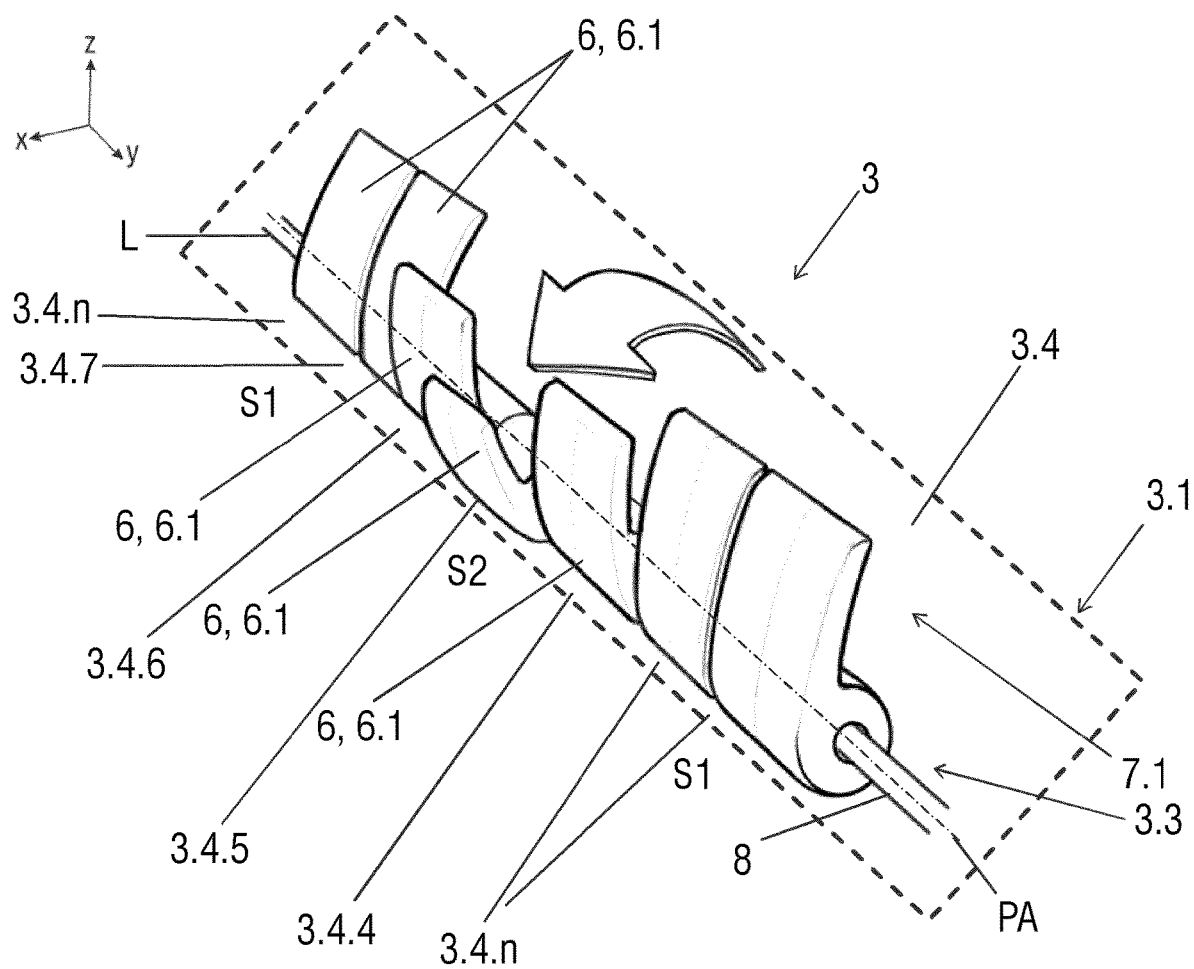
FIG. 5 shows schematically in a perspective view an embodiment of a headrest comprising a headrest cushion and an adjustment device for deformation of a headrest front surface of the headrest cushion.

FIG. 5 shows schematically in a perspective view an embodiment of a headrest 3 comprising a headrest cushion 3.1 and an adjustment device 3.3 for deformation of a headrest front surface 3.4 of the headrest cushion 3.1. The headrest cushion 3.1 comprises a pad 3.1.1 or bolster, e.g. made of foam. The pad 3.1.1 is in contact with the adjustment device 3.3. For example, the pad 3.1.1 is covered by a cover material 3.1.2, wherein the pad 3.1.1 and the cover material 3.1.2 are forming the front surface 3.4 of the headrest cushion 3.1. The adjustment device 3.3 comprises at least one array 7.1 of deforming elements 6 arranged on a back of the front surface 3.4 of the headrest cushion 3.1. In particular, a plurality of deforming elements 6 is arranged adjacent to each other in array 7.1. The adjustment device 3.3 comprises a plurality of movable elements 6.1 which are arranged adjacent to each other along an extending direction, such as the transverse extending direction, of the headrest cushion 3.1. The movable elements 6.1 are configured to push against a back of the front surface 3.4 or front surface areas 3.4.1 to 3.4.n when moving, in particular rotating about a pivot axis PA. The movable elements 6.1 are connected in-line to each other. The movable elements 6.1 are configured to move individually or dependent from each other. For example, the movable elements 6.1 are cam elements which are connected to each other via a rod 8. In particular, the array 7.1 comprises rotating movable elements 6.1, such as cam elements. The movable elements 6.1, in particular rotating elements, rotate individually depending on a feedback from the pressure-sensitivity sensors 4.1 to 4.n arranged in the seat S and which dictate a position of the occupant in relation to the headrest 3. As individual movable elements 6.1 rotate, they push the front surface 3.4 at least partially forward to a desired position, in particular a desired occupant support position. The movable elements 6.1 are individually operated by the control unit 5 depending on a determined and evaluated position of the occupants head.

Figure 6A:
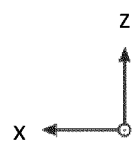
FIGS. 6A to 6C show schematically in side views a deformation of a headrest front surface by an adjustment device according to FIG. 5.
Figure 6A:
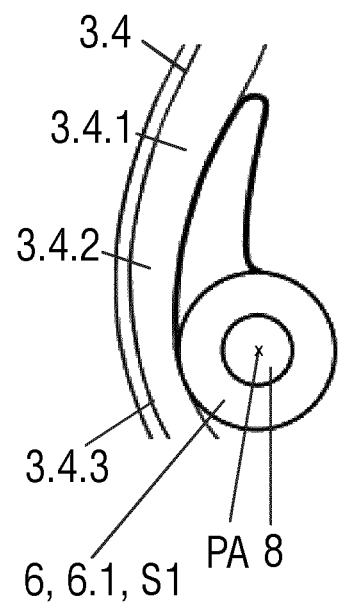
Figure 6B:
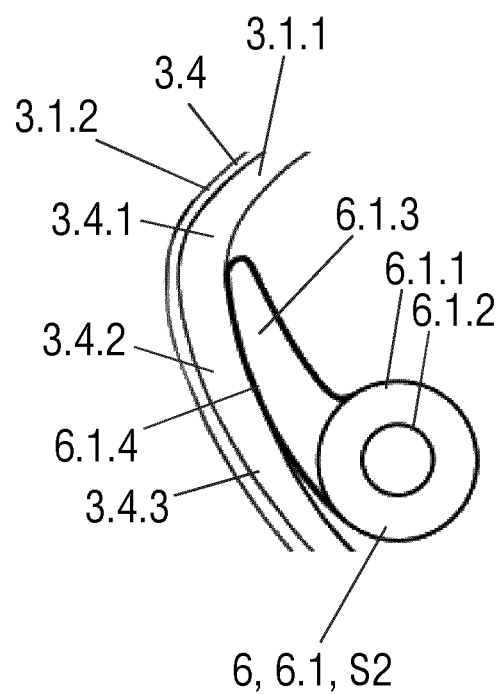
Figure 6C:
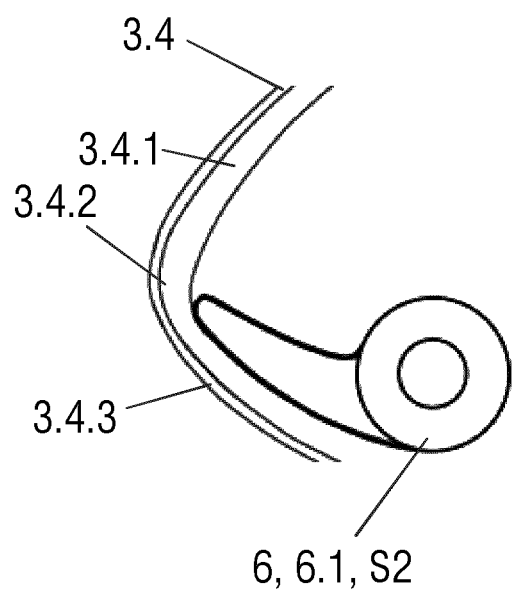

FIGS. 6A to 6C show schematically in side views a deformation of a headrest front surface 3.4 by an adjustment device 3.3 according to FIG. 5. The adjustment device 3.3 comprises movable elements 6.1. The movable elements 6.1 comprise each a base portion 6.1.1 arranged on the rod 8. The base portion 6.1.1 comprises a through-hole 6.1.2 through which the rod 8 is guided. Further, the movable elements 6.1 comprise each a leg portion 6.1.3, e.g. in form of a push element or flap, projecting from the base portion 6.1.1. The leg portion 6.1.3 rotates about the pivot axis PA when the base portion 6.1.1 rotates about the pivot axis PA. The leg portion 6.1.3 comprises a substantially curved leg front surface 6.1.4 to at least partially contact the back of the headrest front surface 3.4 when rotating about the pivot axis PA. The curved leg front surface 6.1.4 is configured to smoothly bias against the back of the headrest front surface 3.4 when deforming it.

Figure 7:
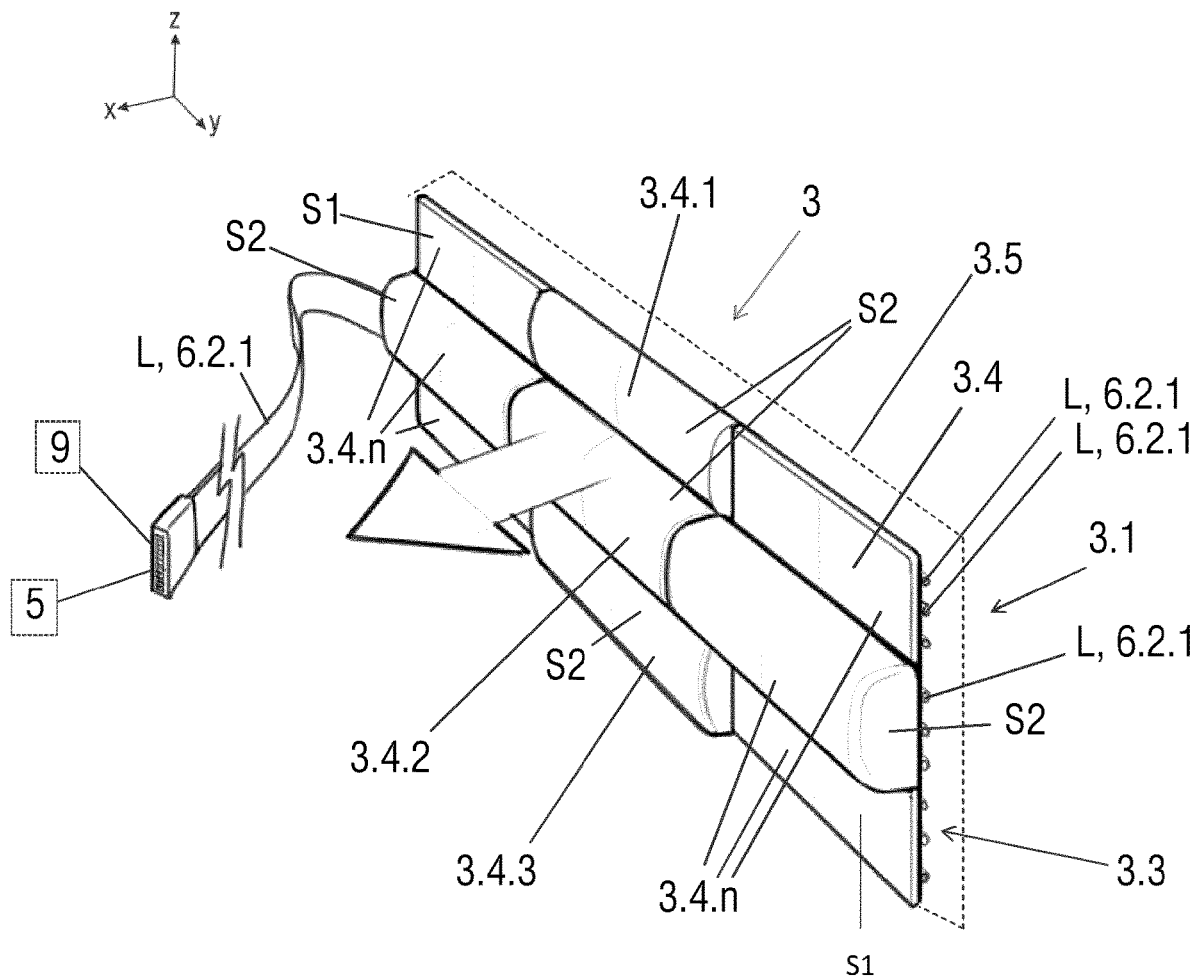
FIG. 7 shows schematically in a perspective view another embodiment of a headrest comprising a headrest cushion and an adjustment device for deformation of a headrest front surface of the headrest cushion.

FIG. 7 shows schematically in a perspective view another embodiment of a headrest 3 comprising a headrest cushion 3.1 and an adjustment device 3.3 for deformation of a headrest front surface 3.4. The adjustment device 3.3 comprises a number of arrays 7.1 to 7.n each having a number of deforming elements 6. Particularly, the adjustment device 3.3 comprises fluid inflatable elements 6.2 which are configured to push against a back of the front surface 3.4 or front surface areas 3.4.1 to 3.4.n of the headrest cushion 3.1. For example, the fluid inflatable elements 6.2 are air inflatable pads, pouches, bladders, cells or the like. In a normal, non-actuated state S1 of the fluid inflatable elements 6.2 these elements are substantially empty and not filled with a fluid, such as air. In an actuated state S2 of the fluid inflatable elements 6.2 these elements are filled with a fluid. Therefore, the adjustment device 3.3 is coupled to one or more fluid supply devices 9, such as fluid suppliers and ventilation devices. As information from the pressure-sensitivity sensors 4.1 to 4.n is sent to the arrays 7.1 to 7.n e.g. through a communication link L, the individual fluid inflatable elements 6.2 inflate to deform the headrest front surface 3.4. The fluid inflatable elements 6.2 may be connected to each other in arrays 7.1 to 7.$n$ e.g. along fluid channels 6.2.1. For example, each fluid inflatable element 6.2 is controllable via the control unit 5. Each front surface area 3.4.1 to 3.4.$n$ comprises a number of fluid inflatable elements 6.2. By controlling different fluid inflatable elements 6.2 different front surface areas 3.4.1 to 3.4.$n$ are deformable. The fluid inflatable elements 6.2 are individually operated by the control unit 5 depending on a determined and evaluated position of the occupants head.

Figure 8:
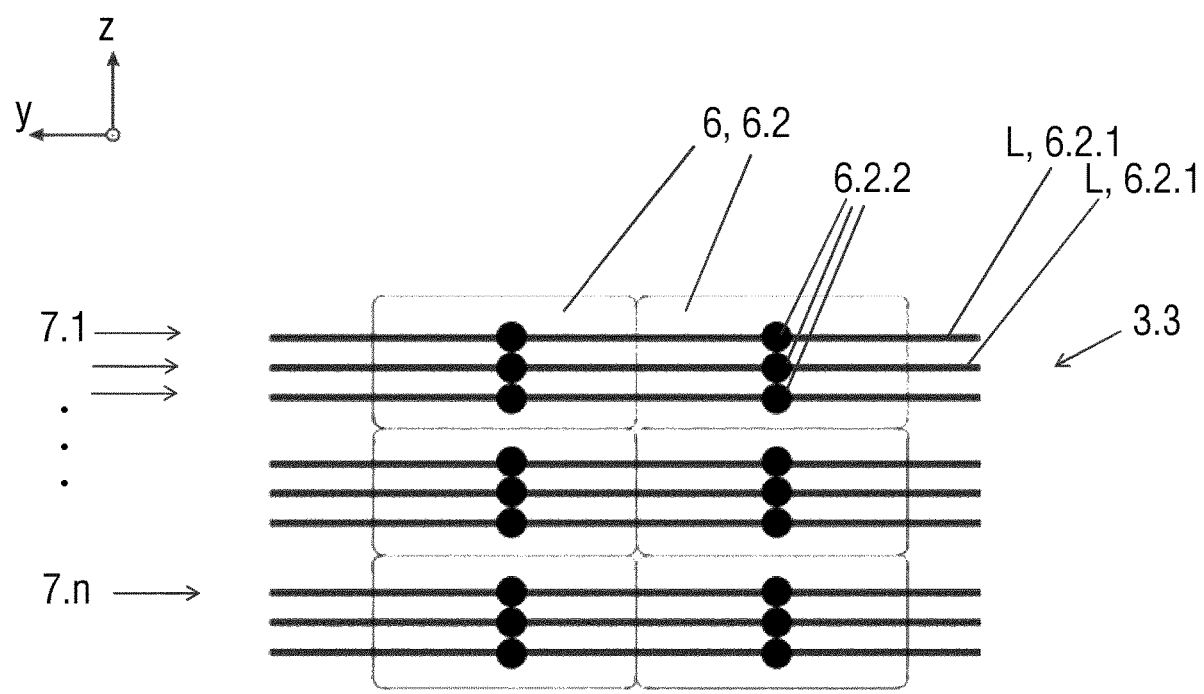
FIG. 8 shows schematically in a rear view an embodiment of an adjustment device comprising arrays of fluid inflatable elements.

FIG. 8 shows schematically in a rear view an embodiment of an adjustment device 3.3 comprising arrays 7.1 to 7.$n$ of fluid inflatable elements 6.2. The fluid inflatable elements 6.2 each comprise a number of fluid inlets 6.2.2, e.g. in form of valves and air inlets, connected to fluid channels 6.2.1, such as air tubes and at least one supply device 9, e.g. an inflation fan.

Figure 9A:
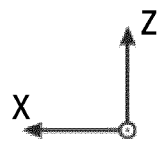
FIGS. 9A and 9B show schematically in side views a deformation of a headrest front surface by an adjustment device according to FIG. 8.
Figure 9A:
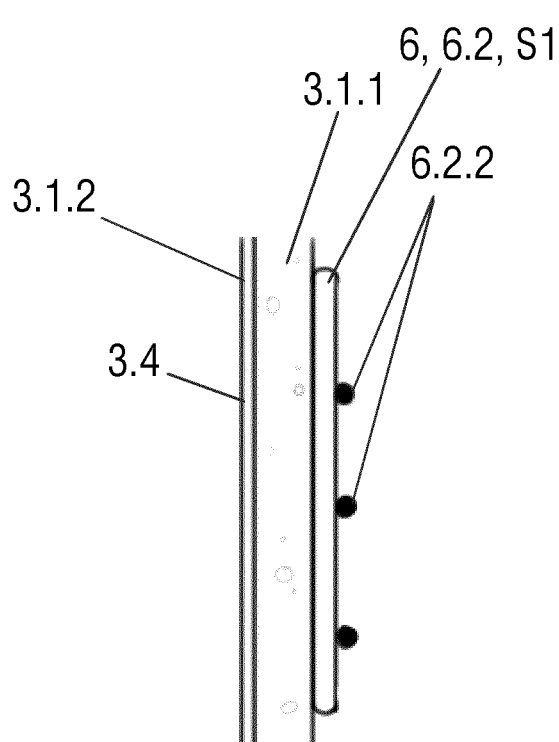
Figure 9B:
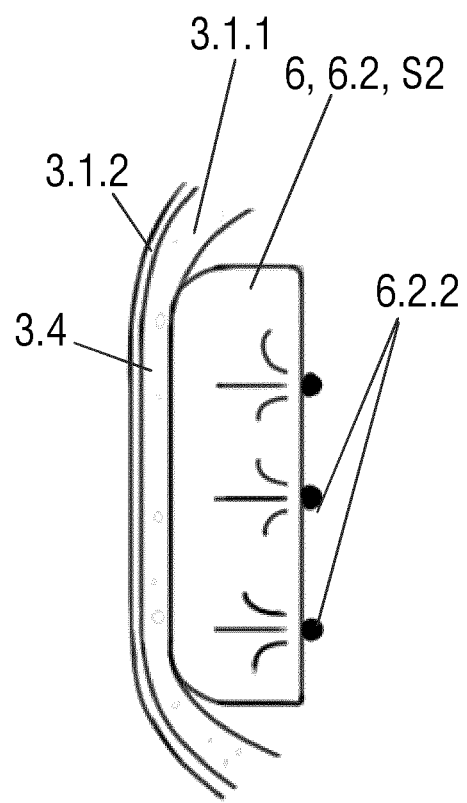

FIGS. 9A and 9B show schematically in side views a deformation of a headrest front surface 3.4 by an adjustment device 3.3 according to FIG. 8. FIG. 9A shows individual fluid inflatable elements 6.2 in a deflated and non-actuated state S1. FIG. 9B shows the individual fluid inflatable elements 6.2 in an inflated, actuated state S1. The individual fluid inflatable elements 6.2 inflate when information is sent to it, pushing the headrest front surface 3.4 forward.

LIST OF REFERENCES

1 seat pan
1.1 seat pan cushion
2 backrest
2.1 backrest cushion
3 headrest
3.1 headrest cushion
3.1.1 pad
3.1.2 cover material
3.2 mounting rods
3.3 adjustment device
3.4 front surface
3.4.1 to 3.4.$n$ surface area
3.5 back surface
4 pressure-sensitivity pad
4.1 to 4.$n$ pressure-sensitivity sensor
5 control unit
6 deforming element
6.1 movable element
6.1.1 base portion
6.1.2 through-hole
6.1.3 leg portion
6.1.4 leg front surface
6.2 fluid inflatable element
6.2.1 fluid channel
6.2.2 fluid inlet
7.1 to 7.$n$ array
8 rod
9 supply device
L communication link
PA pivot axis
S seat
S1 state, in particular non-actuated state
S2 state, in particular actuated state
SZ1, SZ2 seating zone
x longitudinal axis
y transverse axis
z vertical axis

What is claimed:

1. A headrest for a seat, comprising:
a headrest cushion which is mountable to the seat,
wherein the headrest cushion comprises an adjustment device which is configured to at least partially deform a front surface of the headrest cushion along at least one extending direction of the headrest cushion,
wherein the adjustment device comprises at least one array of fluid inflatable elements which are configured to push against a back of the front surface or front surface areas of the headrest cushion,
wherein each array comprises three fluid lines that run laterally along a backside of the fluid inflatable elements,
wherein each fluid line has one fluid inlet coupled to each fluid inflatable element in which it crosses.

2. The headrest according to claim 1, wherein the adjustment device is configured to deform the front surface depending on a determined movement of an occupant's head.

3. The headrest according to claim 1, wherein the front surface is divided into front surface areas and the adjustment device is configured to operate deformation of one or more front surface areas at the same time or in sequence.

4. The headrest according to claim 1, wherein the adjustment device is configured to automatically deform the front surface or front surface areas upon determination of a change of an occupant's position.

5. The headrest according to claim 1, wherein the fluid inflatable elements are arranged adjacent to each other along an extending direction of the headrest cushion.

6. The headrest according to claim 1, wherein the headrest cushion comprises a number of pressure-sensitivity sensors for determining a position or a movement of an occupant's head.

7. The headrest according to claim 6, wherein the adjustment device and the pressure-sensitivity sensors are coupled to each other via a communication link, wherein the adjustment device is configured to be actuated depending on determined signals by the pressure-sensitivity sensors.

8. The headrest according to claim 1, wherein at least the front surface is made of substantially soft and flexible material.

9. The headrest according to claim 1, wherein each fluid line extends along, and connects, two laterally adjacent fluid inflatable elements.

10. The headrest according to claim 1, wherein each fluid line has one of said fluid inlets on the backside of at least two of said fluid inflatable elements.

11. The headrest according to claim 1, wherein each fluid inflatable element has three of said fluid inlets.

12. The headrest according to claim 11, wherein each fluid inflatable element comprises at least one of said fluid inlets, and each fluid inlet is vertically aligned with every other fluid inlet on the fluid inflatable element to which they are attached.

13. The headrest according to claim 1, wherein the fluid lines run parallel to one another along a back side of the fluid inflatable element.

* * * * *